US012800046B2

(12) United States Patent
Bebon

(10) Patent No.: US 12,800,046 B2
(45) Date of Patent: Nov. 17, 2026

(54) VALVE ASSEMBLY, FLUID MANAGEMENT SYSTEM AND A VEHICLE

(71) Applicant: VOLVO TRUCK CORPORATION, Gothenburg (SE)

(72) Inventor: Hugo Bebon, Saint-Priest (FR)

(73) Assignee: VOLVO TRUCK CORPORATION, Gothenburg (SE)

(*) Notice: Subject to any disclaimer, the term of this patent is extended or adjusted under 35 U.S.C. 154(b) by 405 days.

(21) Appl. No.: 18/322,291

(22) Filed: May 23, 2023

(65) Prior Publication Data

US 2023/0383857 A1 Nov. 30, 2023

(30) Foreign Application Priority Data

May 25, 2022 (EP) .................................... 22175478

(51) Int. Cl.
*F16K 17/19* (2006.01)
*F15B 1/26* (2006.01)

(52) U.S. Cl.
CPC .............. *F16K 17/19* (2013.01); *F15B 1/265* (2013.01)

(58) Field of Classification Search
CPC ...... F16K 17/19; F16K 15/023; F16K 15/028; F16K 17/24; F16K 17/18; F15B 1/265; G05D 16/10

(Continued)

(56) References Cited

U.S. PATENT DOCUMENTS 2,638,127 A * 5/1953 Griswold .............. F16K 15/144 137/859
3,080,693 A * 3/1963 Glass ..................... B01D 46/71 96/113

(Continued)

FOREIGN PATENT DOCUMENTS

CN 105042141 A 11/2015
CN 107218423 B 7/2019

(Continued)

OTHER PUBLICATIONS

Extended European Search Report in corresponding European Application No. 22175478.1 dated Nov. 17, 2022 (9 pages).

*Primary Examiner* — Angelisa L. Hicks
(74) *Attorney, Agent, or Firm* — Jeffri A. Kaminski; Venable LLP

(57) ABSTRACT

A valve assembly for a fluid management system of a vehicle is provided The valve assembly includes: a valve body having an inner volume defining at least a first chamber, a second chamber, a breathing chamber in fluid communication with atmosphere, and a fluid medium flow path extending through the valve body, the fluid medium flow path having an inlet for receiving a fluid medium and an outlet for said fluid medium, said first chamber being at least partly disposed in the fluid medium flow path. A flow closing member is displaceable arranged within the valve body to control the flow of fluid medium from the inlet to the outlet via the first chamber. The flow closing member is displaceable between an open position, in which fluid medium may flow in the fluid medium flow path from the inlet to the outlet via the first chamber, and a closed position, in which said flow closing member prevents fluid medium to flow in the fluid medium flow path from the inlet to the outlet.

16 Claims, 3 Drawing Sheets

(58) Field of Classification Search
USPC ............................ 137/458, 528; 251/62, 175
See application file for complete search history.

(56) References Cited

U.S. PATENT DOCUMENTS

| | | | | | |
|---|---|---|---|---|---|
| 3,584,639 | A * | 6/1971 | Potepalov | F15C 3/005 235/201 ME | |
| 4,168,724 | A * | 9/1979 | Graffunder | B01J 19/0046 137/884 | |
| 4,549,888 | A * | 10/1985 | Fannin | B01D 53/261 96/144 | |
| 4,993,922 | A * | 2/1991 | Lauterbach | B60T 17/02 417/279 | |
| 5,386,848 | A * | 2/1995 | Gilchrist | F16K 15/144 137/315.33 | |
| 5,947,239 | A | 9/1999 | Koelzer | | |
| 9,447,890 | B2 * | 9/2016 | Jennings | G05D 16/063 | |
| 10,281,056 | B2 * | 5/2019 | Vu | F16K 7/123 | |
| 2018/0111082 | A1 | 4/2018 | Momoki et al. | | |

FOREIGN PATENT DOCUMENTS

| | | | |
|---|---|---|---|
| JP | 2021039722 | A | 3/2021 |
| WO | 2011061323 | A1 | 5/2011 |

* cited by examiner

VALVE ASSEMBLY, FLUID MANAGEMENT SYSTEM AND A VEHICLE

TECHNICAL FIELD

The present disclosure relates to a valve assembly for a fluid management system of a vehicle. Moreover, the present disclosure relates to a fluid management system for a vehicle provided with such valve assembly. Further, the present disclosure relates to a vehicle provided with such valve assembly and/or fluid managements system. The present disclosure may typically be applied in a fluid management system used as a part of a compressed air system in heavy-duty vehicles, such as trucks, buses, and construction equipment. The present disclosure may likewise be applied in other vehicles such as cars and other light-weight vehicles etc., but also in marine vessels and the like. Other applications are also possible, such as the application of the present disclosure in a stationary power plant system.

BACKGROUND

In the field of compressed air systems for heavy-duty vehicles, there is an increasing demand for improving the efficiency of managing the supply of compressed air to various components connected to the system. One example of a common air management system of a vehicle is the air management system in battery electric vehicle and/or fuel cell electric vehicle. In this type of air management system, there is often an electric air compressor arranged downstream one or more air consumers wherein the electric air compressor is operated to produce compressed air for braking, pneumatic suspensions, and pneumatic auxiliaries.

In order to regulate the supply of compressed air to the air consumers, the air management system also comprises valve, such as an overflow valve (OFV), which is arranged in-between the air outlet of the compressor and e.g. an air dryer of the air management system, and thus also arranged upstream any air storage tank of the system.

A typical overflow valve device may generally include a spring mechanism, such as a coil spring, which is arranged within the valve device to effect a movement of an inside piston member so as to regulate the opening and closing pressures of the overflow. The overflow valve is generally configured to work by sensing the pressures downstream and upstream the valve. In addition, such types of valves provide a fixed opening pressure for the valve, which means that the minimal compressor working pressure is substantially equivalent to the valve opening pressure. In other words, the valve has a specified pressure level maintained by use of the spring mechanism, which opens the flow path when the inlet pressure rises. In some operating situations, the air storage tank pressure is lower than the valve opening pressure. This means that the air compressor operates at a pressure higher than what is needed by the air management system. Such behaviour of the components in an air management system for a heavy-duty vehicle may not always be favourable for many reasons.

It would thus be desirable to improve the operation of the valve for a fluid management system of a vehicle.

SUMMARY

An object of the disclosure is to provide an improved valve assembly for a fluid management system of a vehicle, in which the valve can be operated in a more dynamic manner based on the pressure levels of the fluid management system, thereby allowing for reducing energy waste of the system. The dependent claims are directed to advantageous embodiments of the disclosure.

According to a first aspect of the disclosure, there is provided a valve assembly for a fluid management system of a vehicle. The valve assembly comprises a valve body having an inner volume defining at least a first chamber, a second chamber, a breathing chamber in fluid communication with atmosphere, and a fluid medium flow path extending through the valve body. The fluid medium flow path has an inlet for receiving a fluid medium and an outlet for the fluid medium. The first chamber is at least partly disposed in the fluid medium flow path. The valve assembly also comprises a flow closing member displaceable arranged within the valve body and configured to control the flow of fluid medium from the inlet to the outlet via the first chamber, the flow closing member being displaceable between an open position OP, in which fluid medium is permitted to flow in the fluid medium flow path from the inlet to the outlet via the first chamber, and a closed position CP, in which the flow closing member is positioned to prevent fluid medium to flow in the fluid medium flow path from the inlet to the outlet. The inlet is in pressurized communication with a first area region A1 of the flow closing member when the flow closing member is in the closed position, whereby a first pressure P1 being applied to the first area region A1 of the flow closing member, resulting in a first force F1 which is the product of the first pressure P1 and the area of the first area region subjected to the first pressure. The outlet is in pressurized communication with a second area region A2 of the flow closing member when the flow closing member is in the open position, whereby a second pressure P2 being applied to the second area region A2 of the flow closing member, resulting in a second force F2 which is the product of the second pressure and the area of the second area region subjected to the second pressure.

Moreover, the valve body comprises an additional inlet in pressurized communication with a third area region A3 of the flow closing member, the third area region being located on an opposite side of the flow closing member than the first and second area regions, whereby a third pressure being applied to the third area region A3 of the flow closing member, resulting in a third force F3 which is the product of the third pressure P3 and the area of the third area region subjected to the third pressure, whereby the third force is directed to exert a counteracting force to the first and second forces.

Further, a force difference between the first and third forces controls the movement of the flow closing member from the closed position to the open position, whilst a force difference between the second and third forces controls the movement of the flow closing member from the open position to the closed position.

In this manner, there is provided an improved valve assembly capable of avoiding, or at least reducing the risk, of operating the air compressor at higher pressure levels than what is actually needed by the pneumatic system connected to the fluid management system. That is, by the proposed valve assembly, the valve assembly is configured to operate with a variable opening pressure, where the opening pressure always equals to the system pressure. In this manner, the air compressor of the fluid management system will always operate at a correct pressure, i.e. the system pressure/tank pressure of the fluid management system, thus avoiding energy waste. As such, the air compressor working pressure may never be above the system pressure, which will allow for preventing, or at least reducing, energy waste during operation of the fluid management system in a vehicle. The proposed valve assembly also provides advantages over hitherto known valve devices because current valve devices only provide an opening pressure adapted by changing the load on the spring mechanism. In other words, such valve devices cannot be varied in response to a change of the system pressure.

More specifically, by the arrangement of the flow closing member being displaceable from the closed position to the open position based on the force difference between the first and third forces, there is provided a valve assembly allowing the opening pressure to be variable and controlled by the third pressure, generally corresponding to the system air pressure. That is, the opening pressure for displacing the flow closing member to the open position is equal to third pressure, i.e. the system air pressure. This is contrary to current overflow valve devices (with one inlet port and one outlet port), where the opening pressure is fixed, i.e. the opening pressure mainly depends on the load on spring mechanism. In such valve devices, the opening pressure may sometimes be higher than the system air pressure. Meaning that the air compressor is working at higher pressure than what is needed for the fluid management system, resulting in a high power consumption and a high energy waste.

The proposed valve assembly may generally be intended for controlling compressed air, i.e. a flow of compressed air. However, the valve assembly may likewise be used for controlling flows of other fluid mediums, such as gaseous fluids and/or liquid fluids. Hence, the valve assembly may be configured to control any type of fluid medium in gaseous and/or liquid form.

Typically, a direction of the second force is at least partly the same as a direction of the first force. In some example embodiments, the direction of the second force is exactly the same as the direction of the first force.

The flow closing member may be displaceably arranged in the valve body such that an opening pressure is provided when the first pressure being applied to the first area region of the flow closing member equals, or is greater than, the third pressure being applied to the third area region of the flow closing member.

The flow closing member may be displaceably arranged in the valve body such that a closing pressure is provided when the second pressure being applied to the second area region of the flow closing member is lower than the third pressure being applied to the third area region A3 of the flow closing member.

A pressure difference between the opening pressure and the closing pressure is at least one bar.

The area of the first area region may be substantially the same as the area of the third area region.

The area of the second area region may be proportional in size to the area of the third area region with a factor derivable from the third pressure divided by the third pressure minus a pressure difference between an opening pressure and a closing pressure.

The flow path may extend substantially in a longitudinal direction, and the flow closing member may be displaceable along a centre height direction axis. The centre height direction axis is substantially perpendicular to the longitudinal direction.

The first chamber and the second chamber may be of different volumes.

The flow closing member may comprise a first portion and a second portion, the first portion and second portion having different cross section profiles. It should be noted that the flow closing member may also be provided in several different configuration, and also in the form of a uniform portion, e.g. in the form of a cylindrical shaped flow closing member.

The first portion and the second portion may be cylindrical shaped portions having cross section profiles of different diameters.

The breathing chamber may be defined by parts of the inner side of the valve body in combination with parts of the flow closing member. By way of example, the breathing chamber may be defined by parts of the inner side of the valve body in combination with the first portion and the second portion of the flow closing member.

The breathing chamber may be arranged in a fluid-tight arrangement relative to the first chamber and the second chamber, respectively. The fluid-tight arrangement may be provided by a sealing arrangement.

The breathing chamber may be in fluid communication with the atmosphere by a breathing port extending through a part of the valve body from the inner volume to the atmosphere outside the valve assembly.

The valve assembly may comprise a sealing arrangement arranged on an outer circumferential surface of the flow closing member, the sealing arrangement being configured to provide sealing between the first chamber and the second chamber when the flow closing member displaces between the open and closed positions. By way of example, the sealing arrangement may comprise a first sealing circumferentially arranged about the second portion of the flow closing member. In addition, the sealing arrangement may comprise a second sealing circumferentially arranged about the first portion of the flow closing member. The sealing arrangement also provides for sealing between the flow closing member and an inner side of the valve body, thereby isolating the additional inlet from the inlet and the outlet.

In addition, or alternatively, the first sealing may be circumferentially arranged about the second portion of the flow closing member to provide sealing between the breathing chamber and the second chamber. In addition, or alternatively, the second sealing may be circumferentially arranged about the first portion of the flow closing member to provide sealing between the breathing chamber and the first chamber.

The valve body may comprise an inlet port at least partly defined by the inlet, and configured to be connected to an air compressor for receiving fluid medium in the form of compressed air, an outlet port at least partly defined by the outlet, and configured to be connected to a downstream air management device for delivering compressed air to an air consumer system, and an additional inlet port at least partly defined by the additional inlet, and configured to be connected to a compressed air storage tank for receiving a system pressure from the compressed air storage tank for exerting a counter-pressure against the third area region. One example of an air management device is an air dryer device. One example of an air consumer system is a pneumatic system, such as a braking system or the like.

According to a second aspect, there is provided a fluid management system for a vehicle. The fluid management system comprises a valve assembly according to the first aspect of the present disclosure, an air compressor arranged upstream of the valve assembly and configured to be connected to the inlet of the valve assembly, a compressed air storage tank arranged downstream of the valve assembly and configured to receive compressed air from the air compressor when the valve assembly is in the open position, the additional inlet of the valve assembly being configured to be in pressurized communication with a pressure outlet of the compressed air storage tank, wherein the valve assembly is arranged and configured to control the movement of the flow closing member in response to a change in pressure in the compressed air storage tank.

Effects and features of this second aspect of the present disclosure are largely analogous to those described above in connection with the first aspect of the disclosure. Embodiments mentioned in relation to the first aspect of the present disclosure are largely compatible with the second aspect of the disclosure.

The valve assembly may be arranged and configured to vary the opening pressure for the flow closing member so as to essentially equal a prevailing pressure in the compressed air storage tank.

The fluid management system may further comprise an air dryer device arranged in-between the valve assembly and the compressed air storage tank.

According to one example embodiment, the valve assembly is arranged in-between the compressor and the air dryer device so as to maintain a fluid pressure at a compressor outlet when the compressed air storage tank is full, and the air dryer device is opened to atmosphere. In other words, in fluid management systems including the air dryer device as an integral part of the system, a valve, such as the valve assembly, is needed because when the compressed air tank is full, the air dryer device opens the compressor discharge line to atmosphere, thereby allowing the valve assembly to maintain pressure at the compressor air outlet when air dryer device is opened.

The fluid management system may further comprise a pneumatic system operable from compressed air delivered from the compressed air storage tank.

The fluid management system may further comprise a first fluid conduit for guiding fluid to said valve inlet of the valve assembly, a second fluid conduit for guiding fluid away from said outlet of the valve assembly, and a fluid conduit extending between the air storage tank and the additional inlet, wherein the flow closing member is set to the open position to allow for a fluid communication between the first and second fluid conduits when a pressure in the first fluid conduit is essentially equal to the pressure in the fluid conduit.

In order to prevent pressure drop, the flow closing member may be set to the closed position to terminate the fluid communication between the first and second fluid conduits when a pressure in the second fluid conduit is lower than the pressure in the fluid conduit with a selected closing pressure.

According to a third aspect, there is provided a vehicle comprising a valve assembly according to the first aspect of the present disclosure and/or a fluid management system according to the second aspect of the present disclosure. Effects and features of this third aspect of the present disclosure are largely analogous to those described above in connection with the first and second aspects of the disclosure. Embodiments mentioned in relation to the first and second aspects of the present disclosure are largely compatible with the third aspect of the disclosure.

Further advantages and advantageous features of the disclosure are disclosed in the following description and in the dependent claims. It should also be readily appreciated that different features may be combined to create embodiments other than those described in the following, without departing from the scope of the present disclosure.

BRIEF DESCRIPTION OF THE DRAWINGS

The above, as well as additional objects, features and advantages of the present disclosure, will be better understood through the following illustrative and non-limiting detailed description of exemplary embodiments of the present disclosure, wherein.

DETAILED DESCRIPTION OF EXAMPLE EMBODIMENTS OF THE DISCLOSURE

Figure 1:
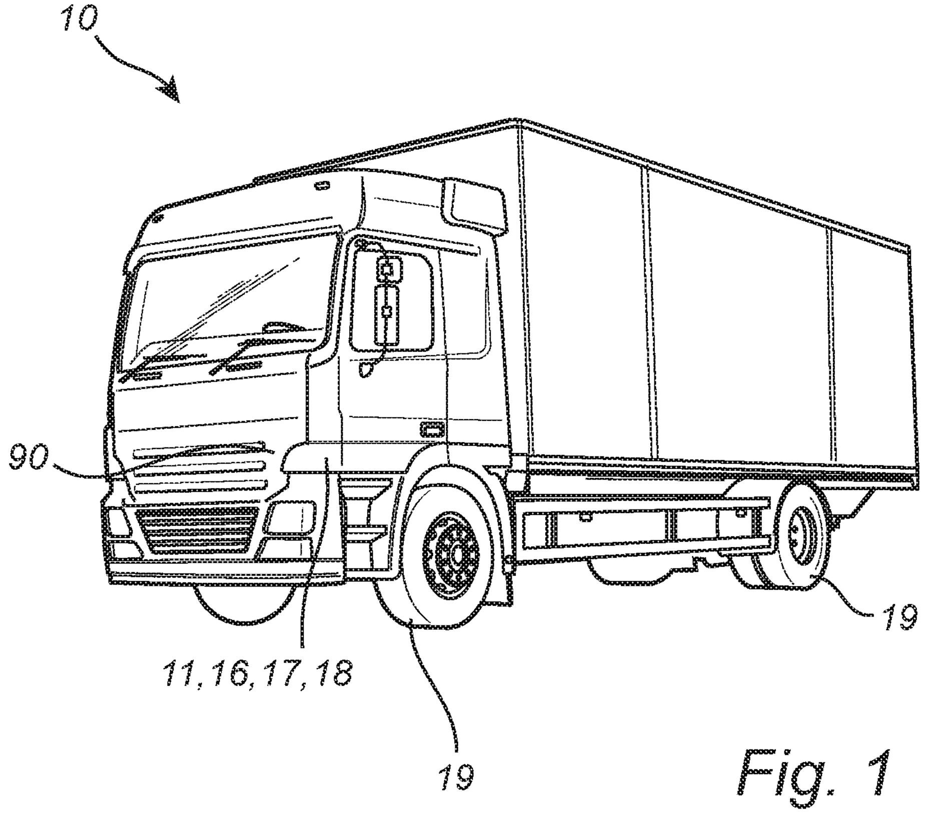
FIG. 1 is a side view of a vehicle comprising a fluid management system having a valve assembly according to an example embodiment of the present disclosure.

The present disclosure will now be described more fully hereinafter with reference to the accompanying drawings, in which an exemplary embodiment of the disclosure is shown. The disclosure may, however, be embodied in many different forms and should not be construed as limited to the embodiment set forth herein; rather, the embodiment is provided for thoroughness and completeness. Like reference character refer to like elements throughout the description.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

Figure 2:
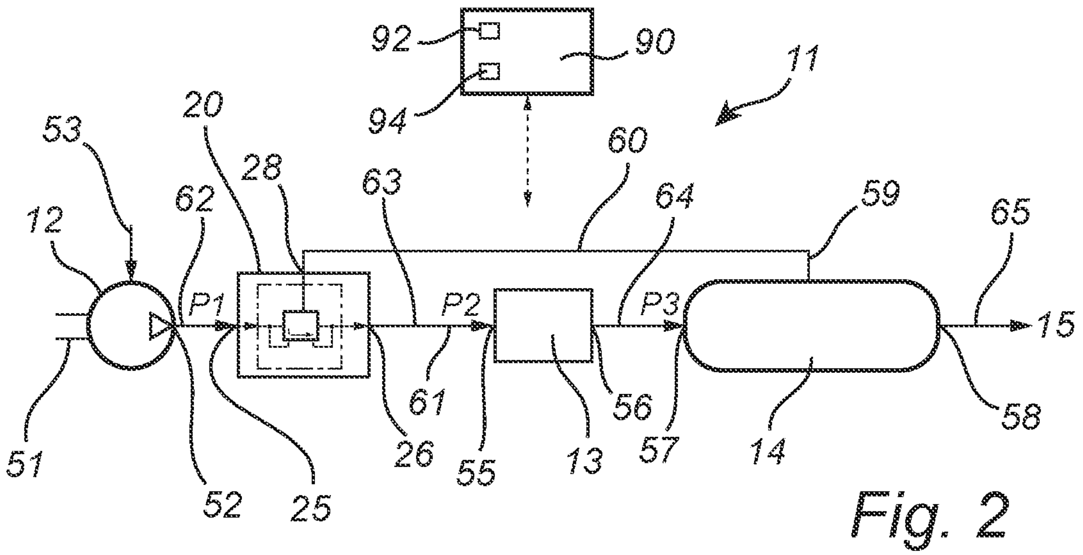
FIG. 2 is a schematic view of further components of a fluid management system comprising a valve assembly according to an example embodiment of the present disclosure, in which the fluid management system can be incorporated into the vehicle illustrated in FIG. 1 in the form of an air management system.

With particular reference to FIG. 1, there is provided a vehicle 10 in the form of a truck. The vehicle 10 is generally a battery electric vehicle or a fuel cell electric vehicle. However, the vehicle 10 may also be provided with other types of powertrain systems. By way of example, the vehicle 10 comprises a traction machine 16 for propelling the wheels 19 of the vehicle 10. The traction machine 16 is here provided in the form of an electric machine arranged to receive electric power from a battery system 17 and/or directly from a fuel cell system 18, as is commonly known in the art. The vehicle 10 also comprises a control unit 90 for controlling various operations and functionalities. The control unit 90 is generally a part of the electronic control unit of the vehicle. In FIG. 2, the control unit 90 comprises a processing circuitry 92 and a memory 94.

Moreover, the vehicle 10 in FIG. 1 comprises a fluid management system 11, as will now be further described in relation to FIGS. 2 to 4*b*. Turning to FIG. 2, there is depicted one example embodiment of the fluid management system 11 for incorporation in the vehicle as described above in relation to FIG. 1.

The fluid management system 11 is here a compressed air management system. In other words, the fluid management system 11 is configured to manage and transport compressed air. Such fluid management systems can be installed and used in various different locations in the vehicle. By way of example, the fluid management system 11 is arranged and configured produce and supply compressed air for a vehicle pneumatic system such as a braking system, a pneumatic suspensions system, and/or one or more pneumatic auxiliaries system installed in the vehicle and/or connected to the vehicle.

In addition, the fluid management system 11 may be arranged and configured to manage other fluid mediums than compressed air. Hence, the fluid management system 11 may likewise be arranged and configured to transfer fluids such liquid fluid mediums and/or other gaseous mediums. However, for ease of reference, the following description will now be provided for a fluid management system 11 in the form of an air management system.

Turning again to FIG. 2, the fluid management system 11 comprises a fluid medium flow circuit 61 for the fluid medium. The fluid management system 11 comprises an air compressor 12. The air compressor is also drivingly connected to a compressor drive shaft 51. The compressor drive shaft 51 is e.g. drivingly connected to a drive system, such an electric motor (although not illustrated). The air compressor 12 is disposed in the fluid medium flow circuit 61. The air compressor 12 comprises an air inlet 53 for receiving air and an outlet 52 for supplying compressed air. The air compressor 12 is configured to receive air via the inlet 53, compress the received air, and supply the compressed air via the outlet 52, as is commonly known in the art. By way of example, the air compressor 12 is an electric air compressor. The electric air compressor can be an oil lubricated screw compressor, an oil lubricated rotary vane compressor, or any other compressor that would need a valve to keep pressure at the compressor air outlet when an air dryer is open to atmosphere.

In addition, as depicted in FIG. 2, the fluid management system 11 comprises a valve assembly 20. The valve assembly comprises an inlet 25, an outlet 26, and an additional inlet 28. The valve assembly 20 is here arranged to control a flow of compressed air. However, the valve assembly 20 may likewise be used for controlling flows of other fluid mediums, such as gaseous fluids and/or liquid fluids. Hence, the valve assembly 20 may be configured to control any type of fluid medium in gaseous and/or liquid form.

As illustrated in FIG. 2, the air compressor 12 is in fluid communication with the valve assembly 20. In addition, the air compressor 12 is arranged upstream of the valve assembly 20. In other words, the valve assembly 20 is arranged downstream the air compressor 12. In FIG. 2, the outlet 52 of the air compressor 12 is fluidly connected to the inlet 25 of the valve assembly 20. As such, the air compressor 12 is arranged upstream of the valve assembly 20 and configured to be connected to the inlet 25 of the valve assembly 20. The fluid medium flow circuit 61 of the fluid medium fluid management system 11 here comprises a first fluid conduit 62 for guiding the compressed air to the inlet 25 of the valve assembly 20. In addition, the fluid medium flow circuit 61 of the fluid management system 11 here comprises a second fluid conduit 63 for guiding compressed away from the outlet 26 of the valve assembly 20. The components of the valve assembly 20 and its functionality will be further described in relation to FIGS. 3 and 4*a* to 4*b*.

In this example, the fluid management system 11 also comprises an air dryer device 13, as shown in FIG. 2. The air dryer device is one example of an air management device. The air dryer device 13 comprises an inlet 55 and an outlet 56. The inlet 55 is connected in fluid communication to the outlet 26 of the valve assembly 20. Accordingly, the valve assembly 20 is in fluid communication with the air dryer device 13. As illustrated in FIG. 2, the air dryer device 13 is arranged downstream the valve assembly 20. air dryer device 13 generally contains a desiccant. The air dryer device 13 is configured to dry the air to an appropriate level. Hereby, the air dryer device 13 is arranged downstream the air compressor 12 and the valve assembly 20 so as to remove moisture from the compressed air by cooling the air, e.g. by means of the desiccant. To this end, water vapor contained in the compressed air is condensed by means of the air dryer device 13. The result is dry compressed air, which can be used in compressed air equipment without causing any damage. On vehicles, air dryer devices are typically composed of desiccant that will adsorb the water. While the arrangement of the air dryer device 13 in the fluid management system 11 may generally be an optional component of the system, the air dryer device 13 is usually an integral part of fluid management system installed and used as an air brake system.

In FIG. 2, the valve assembly 20 is arranged in-between the compressor 12 and the air dryer device 13 so as to maintain a pressure of the compressed air at the compressor outlet 52. One example of the valve assembly 20 will be described below in relation to FIGS. 4*a* and 4*b*.

The fluid management system 11 of FIG. 2 also comprises a compressed air storage tank 14. The compressed air storage tank 14 is another example of an air management device. The compressed air storage tank 14 is arranged downstream of the valve assembly 20. Also, as depicted in FIG. 2, the air dryer device 13 is arranged in-between the valve assembly 20 and the compressed air storage tank 14. The fluid medium flow circuit 61 of the fluid management system 11 here comprises a third fluid conduit 64 for guiding the compressed air from the air dryer device 13 to the compressed air storage tank 14.

The compressed air storage tank 14 is configured to receive compressed air from the air compressor 12 when the valve assembly 20 is in an open position, i.e. open to permit a compressed air to flow from its inlet 25 to its outlet 26. The open position of the valve assembly 20 is described below in relation to FIG. 4*b*.

As mentioned above, the valve assembly 20 also comprises the additional inlet 28. The additional inlet 28 of the valve assembly 20 is configured to be in pressurized communication with a pressure outlet 59 of the compressed air storage tank 14. The compressed air storage tank 14 comprises the pressure outlet 59 as well as an inlet 57 and an outlet 58, as illustrated in FIG. 2. The fluid management system 11 further comprises a fluid conduit 60 extending between the pressure outlet 59 of the compressed air storage tank 14 and the additional inlet 28 of the valve assembly 20, as depicted in FIG. 2.

The outlet 58 of the compressed air storage tank 14 is in fluid communication with a pneumatic system 15. The compressed air storage tank 14 is fluidly connected to the pneumatic system 15 via a fourth fluid circuit part 65, as illustrated in FIG. 2. Thus, the fluid medium flow circuit 61 of the fluid medium fluid management system 11 comprises a fourth fluid conduit part 65 for guiding the compressed air from the compressed air storage tank 14 to the pneumatic system 15.

The pneumatic system 15 is e.g. a braking system. Hence, the air compressor 12 is arranged and configured to produce compressed air for the pneumatic system 15 (such as the braking system). The compressed air is guided from the air compressor 12 to the pneumatic system 15 via the fluid medium flow circuit 61, while the control of the flow of compressed air is provided by the valve assembly 20. Moreover, the fluid management system 11 retains the dry compressed air (from the air dryer device 13) in the compressed air storage tank 14 and supplies the dry compressed air from the compressed air storage tank 14 to the braking system. To this end, the pneumatic system 15 is operable from compressed air delivered from the compressed air storage tank 14. In some vehicles, the fluid management system 11 comprises the pneumatic system 15, however, it may likewise be a separate component connected to the fluid management system 11, e.g. when the pneumatic system is a vehicle external air consumer device connected to the vehicle.

Figure 4A:
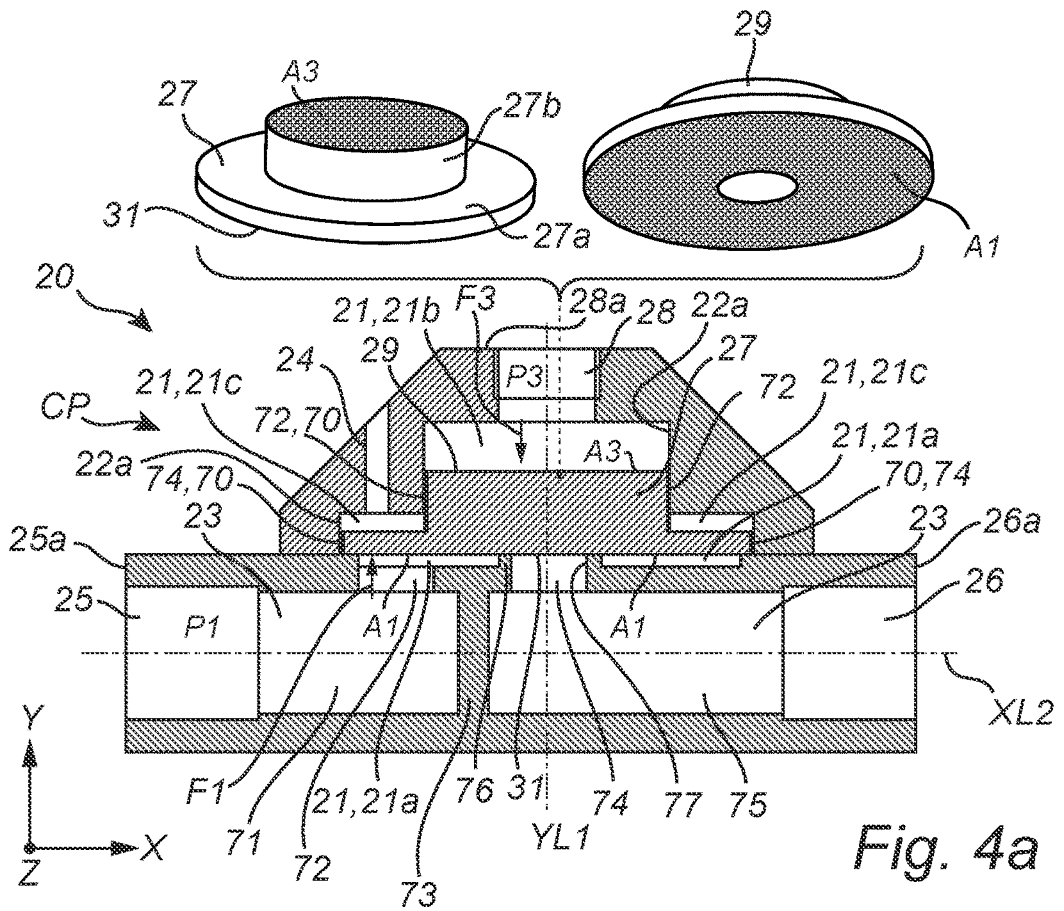
FIGS. 4*a* and 4*b* are cross sectional views of a valve assembly of the fluid management system in FIG. 2 according to an example embodiment of the present disclosure, in which the valve assembly is illustrated in an open position and a closed position.
Figure 4B:
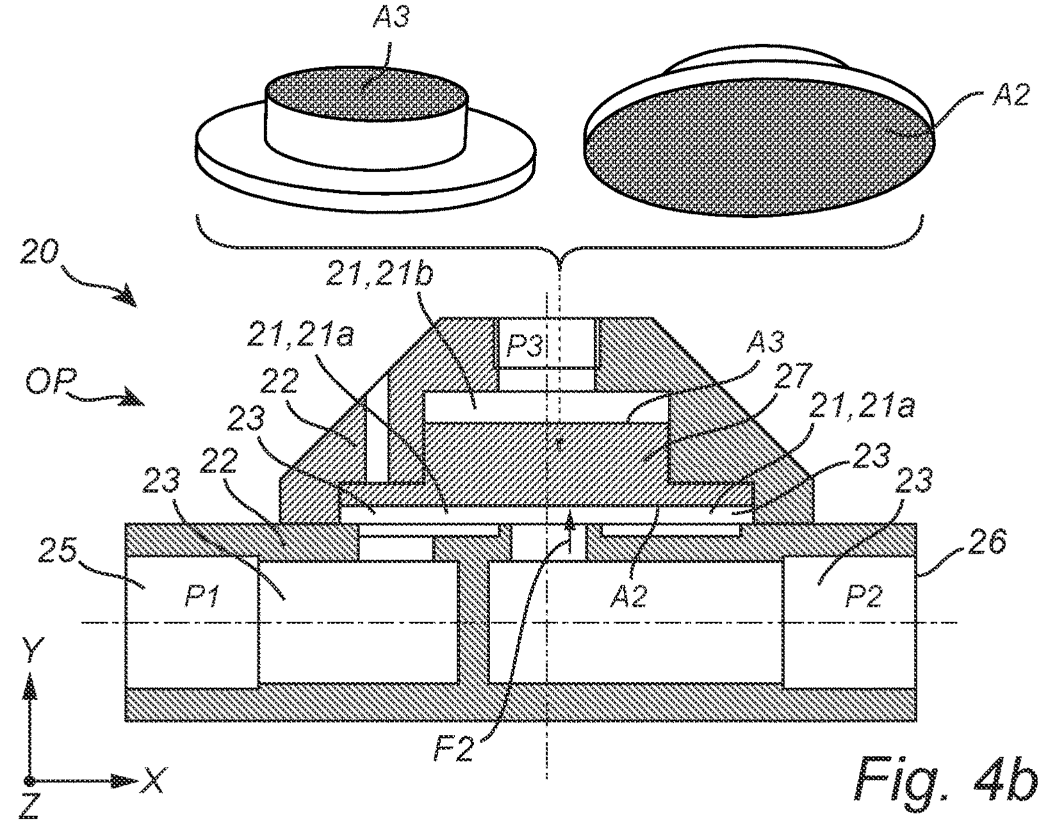

Turning now again to the valve assembly 20, there is illustrated one example embodiment of a valve assembly in FIGS. 4*a* to 4*b* for incorporation into the fluid managements system 11 of FIG. 2. The valve assembly 20 is generally arranged in the fluid management system 11 as depicted in FIG. 2 in combination with FIGS. 4*a* and 4*b*. As also illustrated in e.g. FIGS. 4*a* and 4*b*, the valve assembly 20 extends in a longitudinal direction X, a height direction Y and in a transverse direction Z. In FIGS. 4*a* to 4*b*, the valve assembly 20 is illustrated in a cross sectional view along the longitudinal direction X and the height direction Y.

As illustrated in e.g. FIG. 4*a*, the valve assembly 20 comprises a valve body 22. The valve body 22 defines an inner volume 21. It should be noted that the terms “inner”, “interior”, “inside” and “internal”, as used herein, are generally used in an interchangeable manner. Analogously, the terms “external”, “exterior”, “outside” and “outer” are generally used in an interchangeable manner. In other words, the terms are used to define the relative position or location of a component relative to the valve assembly 20. Sometimes, these terms may also be used to define a surface or a circumference of a component.

The valve body 22 is provided as a housing with a hollow interior in the form of the inner volume 21. As illustrated in FIGS. 4*a* and a4*b*, the inner volume 21 defines a first chamber 21*a* and a second chamber 21*b*. Favourably, the first chamber 21*a* and the second chamber 21*b* is of different volumes. However, in other examples, the first chamber 21*a* and the second chamber 21*b* may be of the same volume. The first chamber 21*a* and the second chamber 21*b* each defines separate volumes of the valve assembly 20. In FIGS. 4*a* and 4*b*, the first chamber 21*a* and the second chamber 21*b* are cylindrical shaped inner volumes (chambers).

The valve body 22 has an inner side 22*a*, as illustrated in e.g. FIG. 4*a*. The first chamber 21*a* and the second chamber 21*b* are at least partly defined by portions of the inner side 22*a*.

The valve assembly 20 also comprises a fluid medium flow path 23. More specifically, the inner volume 21 of the valve body 22 at least partly defines the fluid medium flow path 23. As shown in FIG. 4*a*, the fluid medium flow path 23 extends through the valve body 22. Also, the fluid medium flow path 23 defines the inlet 25 for receiving the compressed air from the air compressor 12 and the outlet 26 for the compressed air. When the valve assembly 20 is fluidly connected to the air compressor 12, the fluid medium flow path 23 is in fluid communication with the fluid medium flow circuit 61.

As depicted in e.g. FIGS. 4*a* and 4*b*, the first chamber 21*a* is at least partly disposed in the fluid medium flow path 23. The fluid medium flow path 23 extends substantially in a first longitudinal direction XL2. In FIGS. 4*a* and 4*b*, the fluid medium flow path 23 also extends in the height direction Y.

In addition, the valve assembly 20 comprises a flow closing member 27, as illustrated in FIGS. 4*a* and 4*b*. As shown in FIGS. 4*a* and 4*b*, the flow closing member 27 extends in the longitudinal direction X, the transverse direction Y and in the height direction Z. The flow closing member 27 is displaceable arranged within the valve body 22 and configured to control the flow of compressed air from the inlet 25 to the outlet 26 via the first chamber 21*a*. The flow closing member 27 is here provided in the form of a piston type member. Further, the flow closing member 27 is displaceable along the height direction Y, here indicated by a centre height direction axis YL1. The centre height direction axis YL1 is perpendicular to the first longitudinal direction XL2, as depicted in FIG. 4*a*. In this example, the centre height direction axis YL1 in the height direction Y of the flow closing member 27 is co-axially arranged with a centre axis of the valve body 22 in the height direction Y, as illustrated in FIG. 4*a*. Accordingly, the flow closing member 27 extends substantially in the height direction Y and the fluid medium flow path 23 extends substantially in the first longitudinal direction XL2.

Moreover, as shown in FIG. 4*a*, the inlet 25 is fluidly connected to the first chamber 23 via a longitudinal passage 71 and a height passage 72 of the fluid medium flow path 23. In a similar vein, the outlet 26 is fluidly connected to the first chamber 23 via a corresponding longitudinal passage 74 and a height passage 75 of the fluid medium flow path 23. The fluid medium flow path 23 is e.g. limited in the longitudinal direction X by an inner wall 73 arranged in the inner volume of the valve body 22. Accordingly, in this example, the valve body 22 comprises an inner wall 73 arranged to guide the fluid medium in the fluid medium flow path 23 in the height direction Y towards the first chamber 21*a* and towards the flow closing member 27. Other designs of the valve assembly and its fluid medium flow path 23 may also be conceivable.

Moreover, the flow closing member 27 is displaceably arranged between an open position OP (as shown in FIG. 4*b*), in which compressed air is permitted to flow in the fluid medium flow path 23 from the inlet 25 to the outlet 26 via the first chamber 21*a*, and a closed position CP (as shown in FIG. 4*a*), in which the flow closing member 27 is positioned to prevent compressed air to flow in the fluid medium flow path 23 from the inlet 25 to the outlet 26.

In the closed position CP, the flow closing member 27 is arranged within the valve body 22 to contact at least one region of the inner side 22*a*. By way of example, as illustrated in FIG. 4*a*, the flow closing member 27 generally abuts a part 76 of the inner wall 73. The inner wall 73 and the part 76 extending in the height direction Y from the inner wall 73 are parts of the valve body 22. In addition, the flow closing member 27 here abuts another portion 77 of the inner side 22*a* of the valve body 22. In this manner, no flow of fluid medium can be directed from the inlet 25 to the outlet 26 via the first chamber 21*a* when the flow closing member 27 is arranged in the closed position CP, as also shown in FIG. 4*a*.

As illustrated in perspective cut-out views in FIGS. 4*a* to 4*b*, the flow closing member 27 has a first side 31 and an opposite second side 29. The first side 31 is located in the first chamber 21*a*. The opposite second side 29 is located in the second chamber 21*b*.

The flow closing member 27 here also comprises a first portion 27*a* and a second portion 27*b*. The first portion 27*a* and the second portion 27*b* have different cross section profiles, as seen along the directions X and Y. The first side 31 is arranged on the first portion 27*a* while the opposite second side 29 is arranged on the second portion 27*b*.

Moreover, the first portion 27*a* and the second portion 27*b* are here provided as cylindrical shaped portions having cross section profiles of different diameters.

The first side 31 of the first portion 27*a* comprises a first area region A1 and a second area region A2. As illustrated in the cut-out view of FIG. 4*a* in comparison with the cut-out view of FIG. 4*b*, the second area region A2 overlaps with the first area region A1 besides the centre area region of the first side 31. In FIGS. 4*a* and 4*b*, the second area region A2 corresponds to the area of the first side 31. To this end, the first side 31 defines the first area region A1 and the second area region A2. Moreover, as illustrated in FIGS. 4*a* and 4*b*, the first area region A1 is an integral part of the second area region A2. That is, the first area region A1 is defined by a portion of the first side 31 that also defines the second area region A2.

The first area region A1 is the part of the first side 31 that is in pressurized communication with the inlet 25 when the flow closing member 27 is in the closed position, as shown in FIG. 4*a*. In this manner, a first pressure P1 is applied to the first area region A1 of the flow closing member 27 when the flow closing member is in the closed position CP. The second area region A2 is the part of the first side 31 that is in pressurized communication with the inlet 25 and the outlet 26 when the flow closing member 27 is in the open position, as shown in FIG. 4*b*. In this manner, a second pressure P2 is applied to the second area region A2 of the flow closing member 27, when the flow closing member 27 is in the open position OP.

In a similar vein, the opposite second side 29 of the second portion 27*b* comprises a third area region A3. By way of example, the third area region A3 corresponds to the area of the second side 29.

In FIGS. 4*a* to 4*b*, the area of the first area region A1 is also substantially the same as the area of the third area region A3. As such, the valve assembly 20 is configured to have an opening pressure equal or above to the pressure in the compressed air storage tank 14, i.e. the valve assembly 20 opens by displacing the flow closing member 27 to the open position when P1 P3, the area A1 on which is applied P1 shall equal at least theoretically to area A3 on which is applied P3.

As illustrated in FIG. 4*a*, illustrating the closed position CP, the inlet 25 is in pressurized communication with the first area region A1 of the flow closing member 27 when the flow closing member 27 is in the closed position CP. As such, the first pressure P1 is applied to the first area region A1 of the flow closing member 27, resulting in a first force F1 which is the product of the first pressure P1 and the area of the first area region A1 subjected to the first pressure P1. The first pressure P1 generally refers to an upstream pressure.

By the term "pressurized connection" or "pressurized communication", as used herein, means that the respective parts are in fluid connection such that the pressure at e.g. the inlet is the same as the pressure against the first area region, resulting in a force acting on the surface.

As illustrated in FIG. 4*b*, illustrating the open position OP, the outlet 26 is in pressurized communication with the second area region A2 of the flow closing member 27 when the flow closing member is in the open position. As such, the second pressure P2 is applied to the second area region A2 of the flow closing member 27, resulting in a second force F2 which is the product of the second pressure P2 and the area of the second area region A2 subjected to the second pressure P2. The second pressure generally refers to a downstream pressure.

In other words, the first side 31 of the flow closing member 27 defines the surface configured to be in pressurized communication with the inlet 25 and the outlet 26 when the flow closing member 27 is in the open position, OP, as depicted in FIG. 4*a*. Hence, in the open position OP, there is a pressure both from the inlet 25 and the outlet 26 when it is in the open position, while in the closed position CP, a part of the first side 31, i.e. the area A1, is only in pressurized communication with the inlet 25, and not the outlet 26.

As illustrated in FIGS. 4*a* and 4*b*, the flow closing member 27 is arranged in the valve body 22 such that a direction of the second force F2 is exactly the same as a direction of the first force F1. Hence, the first and second forces F1 and F2 are acting on the flow closing member 27 substantially in the height direction Y.

Moreover, the valve body 22 here comprises the additional inlet 28. The additional inlet 28 is in pressurized communication with the third area region A3 of the flow closing member 27. The additional inlet 28 is pressurized by the compressed air storage tank 14, as described above. In this manner, there is a third pressure P3 provided to the additional inlet 28, which corresponds to the system pressure. Accordingly, the third pressure P3 is applied to the third area region A3 of the flow closing member 27, resulting in a third force F3 which is the product of the third pressure P3 and the area of the third area region A3 subjected to the third pressure P3

As mentioned above, the third area region A3 is arranged opposite the first area region A1 and second area region A2, as seen in the height direction Y of the flow closing member 27. By having the third area region A3 located on the opposite side 29 of the flow closing member 27 in comparison to the location of the first side 31, defining the first and second area regions A1, A2, the third force F3 is directed to exert a counteracting force to the first and second forces F1, F2.

As the additional inlet 28 is connected to the compressed air storage tank 14, the additional inlet 28 is arranged to enable a pressurized communication between the third area region A3 of the flow closing member 27 and the compressed air storage tank 14, thereby providing a counter-pressure against the opposite second side 29 of the flow closing member 27, resulting in the counter-force, i.e. the third force F3, on the side 29 of the flow closing member 27.

To this end, the first, second and third forces F1, F2 and F3 acting on the flow closing member 27 controls the movement of the flow closing member 27 along the height direction Y.

More specifically, by the arrangement of the flow closing member 27 and the valve assembly 20 as illustrated in FIGS. 4*a* and 4*b*, a force difference between the first force F1 and the third force F3 controls the movement of the flow closing member 27 from the closed position CP to the open position OP. Further, a force difference between the second force F2 and the third force F3 controls the movement of the flow closing member 27 from the open position OP to the closed position CP.

As such, the flow closing member 27 is displaceably arranged in the valve body 22 such that an opening pressure is provided when the first pressure P1 being applied to the first area region A1 of the flow closing member 27 equals the third pressure P3 being applied to the third area region A3 of the flow closing member 27. Also, the flow closing member 27 is displaceably arranged in the valve body 22 such that the opening pressure is provided when the first pressure P1 being applied to the first area region A1 of the flow closing member 27 is greater than the third pressure P3 being applied to the third area region A3 of the flow closing member 27.

The opening pressure is here defined as the pressure needed for setting (moving) the flow closing member 27 in the open position OP, as shown in FIG. 4*b*.

The flow closing member 27 is here also displaceably arranged in the valve body 22 such that a closing pressure is provided when the second pressure P2 being applied to the second area region A2 of the flow closing member 27 is lower than the third pressure P3 being applied to the third area region A3 of the flow closing member 27.

The closing pressure is here defined as the pressure needed for setting (moving) the flow closing member 27 in the closed position CP, as shown in FIG. 4*a*.

In other words, the pressure difference between the second pressure P2 and the third pressure P3 to close the valve assembly 20 depends on the ratio between the second area region A2 and the third area region A3.

By way of example, the area of the second area region A2 is proportional in size to the area of the third area region A3 with a factor derivable from the third pressure P3 divided by the third pressure P3 minus a pressure difference between an opening pressure and a closing pressure. The above can also be defined by the following relationship:

$$A2=A3\times(P3\div(P3-\Delta P))$$

where ΔP is the difference between the opening pressure and the closing pressure.

As mentioned above, the valve assembly 20 is operable based on the first pressure P1, the second pressure P2 and the third pressure (also denoted as the system pressure) P3. The first pressure P1 generally refers to an upstream pressure of the valve assembly 20, the second pressure P2 generally refers to a downstream pressure of the valve assembly 20, whilst the third pressure P3 generally refers to a system pressure as defined by the pressure in the compressed air storage tank 14. In other words, the first pressure P1 generally refers to the pressure in the discharge line, i.e. the fluid medium flow circuit 61, between the air compressor 12 and the valve assembly 20 (i.e. before the valve assembly 20), the second pressure P2 generally refers to the pressure in the discharge line, i.e. the fluid medium flow circuit 61, between the valve assembly 20 and the air dryer device 13 (i.e. downstream the valve assembly), and the third pressure P3 generally refers to the pressure downstream the air dryer device 13 (i.e. in the compressed air storage tank 14), which is also denoted herein as the system pressure.

As used herein, the terms "upstream" and "downstream" refer to the relative direction with respect to fluid flow in the fluid management system 11, as indicated by the arrows in FIG. 2. For example, "upstream" refers to the direction from which the fluid flows, and "downstream" refers to the direction to which the fluid flows. Accordingly, in this context, the terms upstream and downstream are generally defined relative to the flow of compressed air from the air compressor 12 to the tank 14.

In other words, by the above configuration of the valve assembly 20, the valve assembly 20 is arranged and configured to control the movement of the flow closing member 27 in response to a change in pressure in the compressed air storage tank 14.

Further, the valve assembly 20 is thus arranged and configured to vary the opening pressure for the flow closing member 27 so as to essentially equal a prevailing pressure, i.e. the system pressure, in the compressed air storage tank 14.

Typically, although strictly not necessary, the closing pressure amounts to about 80 to 90% of the opening pressure. By way of example, a pressure difference between the opening pressure and the closing pressure is e.g. at least one bar. Such magnitude of the pressure difference provides for avoiding pressure drop when the valve assembly 20 is closing (i.e. the air dryer device is opening to atmosphere and pressure downstream the valve assembly falls to atmospheric pressure). In such situations, the valve assembly should close in a quick manner. At least for this reason, the pressure difference between opening and closing pressures should be limited. A magnitude of a one bar pressure difference may generally be acceptable, but the pressure difference could be less or more depending on the system and its environment.

As illustrated in e.g. FIG. 4*a*, the inner volume 21 also defines a breathing chamber 21*c* in fluid communication with the atmosphere. That is, the valve assembly 20 comprises a breathing chamber 21*c* located inside the valve body 22. The breathing chamber 21*c* is in fluid communication with the atmosphere via a breathing port 24.

As illustrated in FIG. 4*a*, the breathing chamber 21*c* is in fluid communication with the atmosphere (i.e. outside the valve assembly) by the breathing port 24 extending through a part of the valve body 22 from the inner volume 21 to the atmosphere, corresponding to the outside of the valve assembly 20.

The breathing chamber 21*c* and the breathing port 24 are provided to evacuate air from parts of the inner volume when the flow closing member 27 is displaced along the centre height direction axis YL1, as illustrated in FIG. 4*a*. Hereby, the breathing port 24 allows for evacuation of air or filling of air depending on the displacement direction of the flow closing member 27.

As depicted in FIGS. 4*a* and 4*b*, the breathing chamber 21*c* is defined by a part of the flow closing member 27. The breathing chamber 21*c* is here also defined by a part of the inner side of the valve body 27, as illustrated in FIG. 4*a*. The breathing chamber 21*c* here comprises the breathing port 24. The arrangement of the breathing chamber 21*c* in fluid communication with atmosphere via the breathing port 24 ensures that the flow closing member can be displaceable as described above. Without the breathing chamber 21*c* arranged in fluid communication with atmosphere, there would be a closed volume that would prevent the flow closing member 27 to move as intended in the height direction Y.

Moreover, in order to provide a fluid tight configuration between the respective chambers 21*a*, 21*b* and 21*c*, the valve assembly 20 also comprises a sealing arrangement 70. The sealing arrangement 70 is arranged in-between the flow closing member 27 and inner sides 22*a* of the valve body 22.

By way of example, the sealing arrangement 70 comprises a first sealing 72 circumferentially arranged about the second portion 27*b* of the flow closing member 27.

In addition, the sealing arrangement 70 comprises a second sealing 74 circumferentially arranged about the first portion 27*a* of the flow closing member 27.

Sealing is provided between the flow closing member 27 and the inner side 22*a* of the valve body 22 to separate and isolate the additional inlet 28 from the inlet 25 and the outlet 26. The first and second sealings 72, 74 are e.g. sealing members made of rubber or any similar material.

Hence, the first chamber 21*a* and the second chamber 21*b* are separated from each other by the flow closing member 27 and the sealing arrangement 70.

In addition, the first sealing 72 circumferentially arranged about the second portion 27*b* of the flow closing member 27 is arranged to provide sealing between the breathing chamber 21*c* and the second chamber 21*b*. In a similar vein, the second sealing 74 circumferentially arranged about the first portion 27*a* of the flow closing member 27 is arranged to provide sealing between the breathing chamber 21*c* and the first chamber 21*a*.

By the arrangement of the valve assembly 20 as illustrated in FIG. 2 in combination with FIGS. 4*a* and 4*b*, the flow closing member 27 is arranged and set to the open position to allow for a fluid communication between the first and second fluid conduits 62, 63 when a pressure in the first fluid conduit 62 is essentially equal to the pressure in the fluid conduit 60.

In order to prevent pressure drop, the flow closing member 27 is arranged and set to the closed position to terminate the fluid communication between the first and second fluid conduits 62, 63 when a pressure in the second fluid conduit 63 is lower than the pressure in the fluid conduit 60 with a selected closing pressure of e.g. about 1 bar. The selected closing pressure may be set to a higher pressure in some configurations for some fluid management systems.

As mentioned above, the valve assembly 20 is thus arranged in-between the compressor 12 and the air dryer device 13 so as to maintain a fluid pressure at the compressor outlet 52 when the compressed air storage tank 14 is full and the air dryer device 13 is opened to atmosphere.

The valve assembly 20 can be connected to the air compressor 12 and the air dryer device 13 in several different ways. By way of example, as illustrated in FIGS. 4*a* to 4*b* in conjunction with FIG. 2, the valve body 22 comprise an inlet port 25*a* at least partly defined by the inlet 25. The inlet port 25*a* is configured to be connected to the air compressor 12 for receiving the compressed air. The valve body 22 further comprises an outlet port 26*a* at least partly defined by the outlet 26. The outlet port 26*a* is configured to be connected to the air dryer device 13, i.e. a downstream air management device, for delivering compressed air to an air consumer system, i.e. the pneumatic system 15, e.g. the braking system, and via the compressed air storage tank 14. The valve body 22 also comprises an additional inlet port 28*a* at least partly defined by the additional inlet 28. The additional inlet port 28*a* is configured to be connected to the compressed air storage tank 14 for receiving the system pressure from the compressed air storage tank 14 for exerting the counter-pressure against the third area region A3. The inlet port 25*a*, outlet port 26*a* and the additional inlet port 28*a* each comprises a threaded connection (not illustrated) for connecting to the respective components. Other configurations are also possible, such as a bolt and nut configuration.

Figure 3:
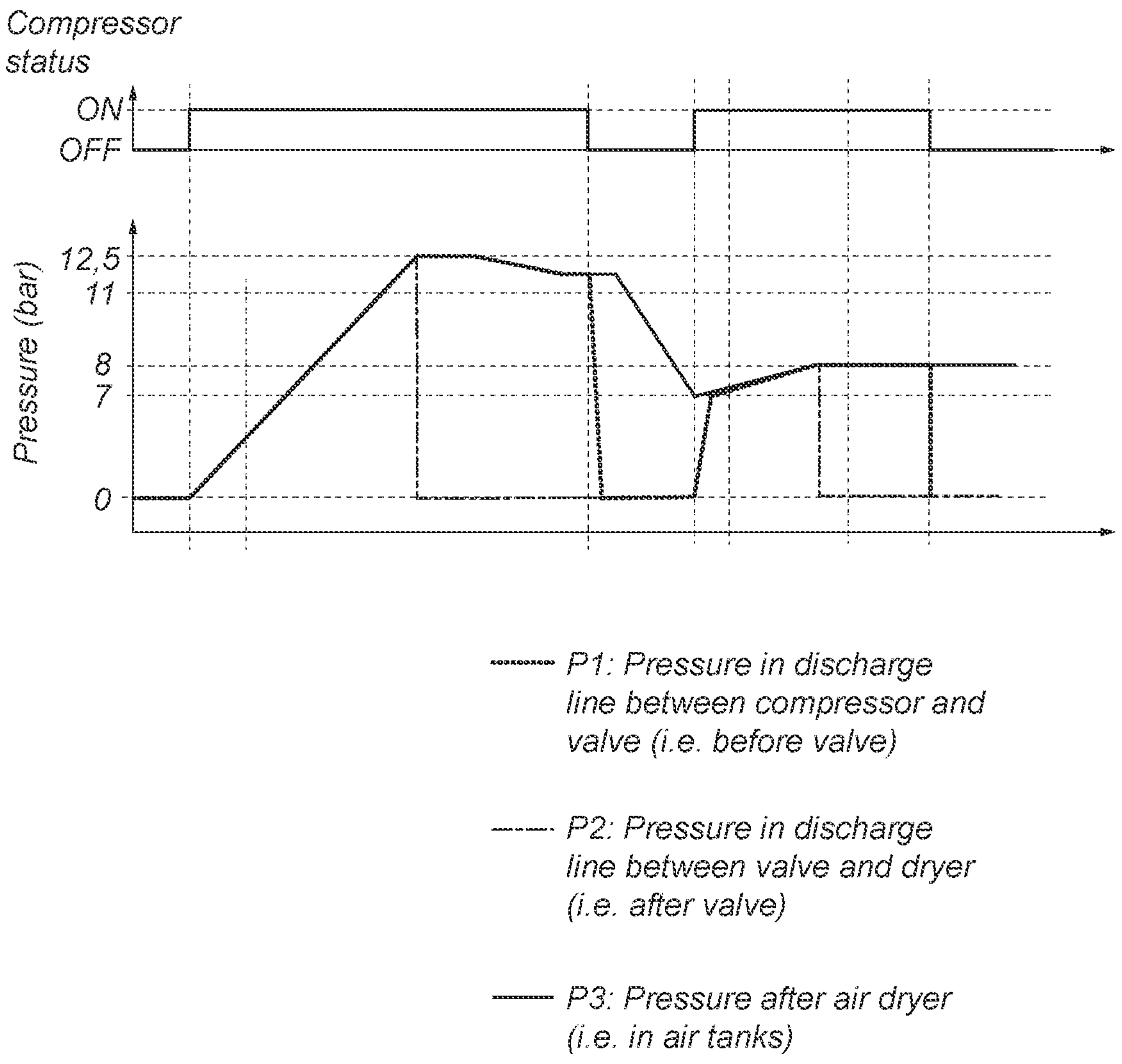
FIG. 3 is a graph showing compressor status in view of pressure levels in bar in the discharge line at various positions.

FIG. 3 illustrates the status of the air compressor 12 vis a vis the air pressure at various position along the fluid medium flow path defined by the fluid medium circuit 61 for a given operation time period. As can be readily appreciated from FIG. 3, the working pressure of the air compressor 12, corresponding to the first pressure P1, i.e. the upstream pressure (dotted line), is never above the system pressure, corresponding to the third pressure P3 (solid line). In other words, there is no energy waste in operating the air compressor 12 in the fluid management system 11.

By way of example, at start of the vehicle 10, all relative pressures are null, and the air management system is empty. Subsequently, the air compressor 12 is started to deliver compressed air. As soon as the pressure before the valve assembly 20, i.e. the first pressure P1, reaches the pressure in the compressed air storage tank 14, i.e. the third pressure P3, the valve assembly 20 opens, and compressed air is delivered to the air dryer device 13 and the compressed air storage tank 14.

The first pressure P1 is then always at same level as the third pressure P3, thus avoiding energy waste. So, both the first pressure P1 and third pressure P3 increase simultaneously (while the first pressure P1 being slightly above the third pressure P3 to open the valve).

When the third pressure P3 reaches maximum pressure, e.g. 12.5 bar, the air dryer device 14 directly opens to atmosphere, and the second pressure P2 falls at 0 bar.

In some cases, the air compressor 12 continues to operate to reach a temperature high enough to evaporate any liquid water (i.e. an anti-condensation function). Thanks to the valve assembly 20, the pressure is maintained at compressor air outlet (P1>0) and follows the third pressure P3.

After certain time, the air compressor 12 is stopped (the temperature is reached), and the pressure remains at the compressor air outlet thanks to valve assembly 20, thus avoiding oil carry over that could occur due to high pressure drop, and the first pressure P1 is slowly evacuated through the compressor air inlet down to 0 bar.

Usually, the air compressor 12 is restarted due to a low third pressure P3. As a consequence, the first pressure P1 increases up to the third pressure P3, and the valve assembly 20 opens, thereby allowing compressed air delivery to the compressed air storage tank 14. As mentioned above, both the first pressure P1 and the third pressure P3 increase simultaneously up to a new max pressure in the compressed air storage tank 14, e.g. 8 bar.

Thanks to the configuration of the valve assembly 20, in particular the arrangement with the additional inlet 28, the valve assembly 20 is configured to connect to the system pressure (third pressure P3) of the compressed air storage tank 14. In this manner, the opening pressure of the valve assembly 20 is variable and depends on the system pressure and is also equal to the system pressure.

The valve assembly 20 and the fluid management system 11 are configured to be controlled by the control unit 90. The control unit 90 may include a microprocessor, microcontroller, programmable digital signal processor or another programmable device. Thus, the control unit 90 typically comprises electronic circuits and connections as well as processing circuitry 92 such that the control unit 90 can communicate with valve assembly 20 and different parts of the fluid management system 11, as illustrated in FIG. 2. Typically, the control unit 90 may also be configured to communicate with other parts of the vehicle such as the brakes, suspension, and any electrical auxiliary devices, e.g. the air conditioning system, in order to operate the vehicle according to the driver's needs. The control unit may comprise modules in either hardware or software, or partially in hardware or software and communicate using known transmission buses such as CAN-bus and/or wireless communication capabilities. The processing circuitry 92 may be a general purpose processor or a specific processor. The control unit 90 typically comprises a non-transistory memory 94 for storing computer program code and data upon. Thus, the control unit 90 may be embodied by many different constructions.

The control unit 90 may include any number of hardware components for conducting data or signal processing or for executing computer code stored in a memory 94. The memory 94 may be one or more devices for storing data and/or computer code for completing or facilitating the various methods described in the present description. The memory 94 may include volatile memory or non-volatile memory. The memory 94 may include database components, object code components, script components, or any other type of information structure for supporting the various activities of the present description. According to an exemplary embodiment, any distributed or local memory device may be utilized with the systems and methods of this description. According to an exemplary embodiment the memory 94 is communicably connected to the processor (e.g., via a circuit or any other wired, wireless, or network connection) and includes computer code for executing one or more processes described herein.

To sum up, the disclosure also relates to the fluid management system 11 for the vehicle 10, as illustrated in e.g. FIG. 1. The fluid management system 11 comprises the valve assembly 20 according to any one of example embodiments described in relation to the FIGS. 2 to 4*b*. In particular, the valve assembly 20 comprises the valve body 22 having the inner volume 21 defining at least the first chamber 24*a*, the second chamber 24*b*, the breathing chamber 24*c* in fluid communication with atmosphere, and the fluid medium flow path 23 extending through the valve body. The fluid medium flow path comprises the inlet 25 for receiving a fluid medium, such as compressed air, and the outlet 26 for fluid medium. The first chamber is at least partly disposed in the fluid medium flow path. The valve assembly 20 also comprises the flow closing member 27 displaceable arranged within the valve body 22 and configured to control the flow of fluid medium from the inlet to the outlet via the first chamber. The flow closing member is displaceable between the open position OP, in which fluid medium is permitted to flow in the fluid medium flow path from the inlet to the outlet via the first chamber, and the closed position CP, in which the flow closing member 27 is positioned to prevent fluid medium to flow in the fluid medium flow path from the inlet to the outlet. The inlet is arranged in pressurized communication with a first area region A1 of the flow closing member 27 when the flow closing member 27 is in the closed position, whereby a first pressure P1 being applied to the first area region A1 of the flow closing member, resulting in a first force F1 which is the product of the first pressure P1 and the area of the first area region subjected to the first pressure. The outlet is in pressurized communication with the second area region A2 of the flow closing member 27 when the flow closing member 27 is in the open position, whereby the second pressure P2 being applied to the second area region A2 of the flow closing member, resulting in a second force F2 which is the product of the second pressure and the area of the second area region subjected to the second pressure. Moreover, the valve body comprises the additional inlet 28 in pressurized communication with the third area region A3 of the flow closing member. The third area region A3 is located on the opposite side 29 of the flow closing member than the first and second area regions A1, A2, whereby the third pressure being applied to the third area region A3 of the flow closing member, resulting in a third force F3 which is the product of the third pressure P3 and the area of the third area region subjected to the third pressure, whereby the third force is directed to exert the counteracting force to the first and second forces. Hereby, the force difference between the first and third forces controls the movement of the flow closing member from the closed position to the open position, whilst the force difference between the second and third forces controls the movement of the flow closing member from the open position to the closed position. The disclosure also relates to the vehicle 1 comprising the valve assembly according to any of one of the example embodiments above and/or the fluid management system according to any one of the example embodiments above.

It is to be understood that the present disclosure is not limited to the embodiments described above and illustrated in the drawings; rather, the skilled person will recognize that many changes and modifications may be made within the scope of the appended claims.

The invention claimed is:

1. A valve assembly for a fluid management system of a vehicle, said valve assembly comprising:

a valve body having an inner volume defining at least a first chamber, a second chamber, a breathing chamber in fluid communication with atmosphere, and a fluid medium flow path extending through the valve body, the fluid medium flow path having an inlet for receiving a fluid medium and an outlet for said fluid medium, said first chamber being at least partly disposed in the fluid medium flow path;

a flow closing member displaceable arranged within the valve body and configured to control the flow of fluid medium from said inlet to said outlet via said first chamber, said flow closing member being displaceable between an open position, in which fluid medium is permitted to flow in the fluid medium flow path from the inlet to the outlet via the first chamber, and a closed position, in which said flow closing member is positioned to prevent fluid medium to flow in the fluid medium flow path from the inlet to the outlet, said inlet being in pressurized communication with a first area region of said flow closing member when said flow closing member is in the closed position, whereby a first pressure being applied to said first area region of said flow closing member, resulting in a first force which is the product of the first pressure and the area of the first area region subjected to the first pressure, said outlet being in pressurized communication with a second area region of said flow closing member when said flow closing member is in the open position, whereby a second pressure being applied to said second area region of said flow closing member, resulting in a second force which is the product of the second pressure and the area of the second area region subjected to the second pressure, wherein said valve body comprises an additional inlet in pressurized communication with a third area region of said flow closing member, said third area region being located on an opposite side of said flow closing member than the first and second area regions, whereby a third pressure being applied to said third area region of said flow closing member, resulting in a third force which is the product of the third pressure and the area of the third area region subjected to the third pressure, whereby said third force is directed to exert a counteracting force to the first and second forces, wherein a force difference between said first and third forces controls the movement of said flow closing member from said closed position to said open position, whilst a force difference between said second and third forces controls the movement of said flow closing member from said open position to said closed position, and wherein the breathing chamber is defined by a part of the flow closing member and a part of the inner side of the valve body, and is in fluid communication with atmosphere via a breathing port.

2. Valve assembly according to claim 1, wherein said flow closing member is displaceably arranged in said valve body such that an opening pressure is provided when the first pressure being applied to said first area region of said flow closing member equals, or is greater than, the third pressure being applied to said third area region of said flow closing member.

3. Valve assembly according to claim 1, wherein said flow closing member is displaceably arranged in said valve body such that a closing pressure is provided when the second pressure being applied to said second area region of said flow closing member is lower than the third pressure being applied to said third area region of said flow closing member.

4. Valve assembly according to claim 3, wherein a pressure difference between the opening pressure and the closing pressure is at least one bar.

5. Valve assembly according to claim 1, wherein the area of said first area region is substantially the same as the area of said third area region.

6. Valve assembly according to claim 1, wherein the area of said second area region is proportional in size to the area of said third area region with a factor derivable from the third pressure divided by the third pressure minus a pressure difference between an opening pressure and a closing pressure.

7. Valve assembly according to claim 1, wherein said flow path extends substantially in a longitudinal direction, and said flow closing member being displaceable along a centre height direction axis, said centre height direction axis being substantially perpendicular to said longitudinal direction.

8. Valve assembly according to claim 1, wherein said first chamber and said second chamber are of different volumes.

9. Valve assembly according to claim 1, wherein the flow closing member comprises a first portion and a second portion, said first portion and second portion having different cross section profiles.

10. Valve assembly according to claim 9, wherein the first portion and the second portion are cylindrical shaped portions having cross section profiles of different diameters.

11. Valve assembly according to claim 1, wherein said valve body comprising:

an inlet port at least partly defined by the inlet, and configured to be connected to an air compressor for receiving fluid medium in the form of compressed air, an outlet port at least partly defined by the outlet, and configured to be connected to a downstream air management device for delivering compressed air to an air consumer system, and an additional inlet port at least partly defined by the additional inlet, and configured to be connected to a compressed air storage tank for receiving a system pressure from said compressed air storage tank for exerting a counter-pressure against the third area region.

12. A fluid management system for a vehicle, said fluid management system comprising:

a valve assembly according to claim 1, an air compressor arranged upstream of said valve assembly and configured to be connected to the inlet of the valve assembly, a compressed air storage tank arranged downstream of said valve assembly and configured to receive compressed air from said air compressor when said valve assembly is in the open position, said additional inlet of said valve assembly being configured to be in pressurized communication with a pressure outlet of said compressed air storage tank, wherein said valve assembly is arranged and configured to control the movement of said flow closing member in response to a change in pressure in the compressed air storage tank.

13. Fluid management system according to claim 12, wherein said valve assembly is arranged and configured to vary the opening pressure for the flow closing member so as to essentially equal a prevailing pressure in the compressed air storage tank.

14. Fluid management system according to claim 12, further comprising an air dryer device arranged in-between said valve assembly and the compressed air storage tank.

15. Fluid management system according to claim 12, further comprising a pneumatic system operable from compressed air delivered from the compressed air storage tank.

16. A vehicle comprising a valve assembly according to claim 1.

* * * * *